United States Patent [19]

Nagano

[11] Patent Number: 5,257,855
[45] Date of Patent: Nov. 2, 1993

[54] QUICK RELEASE APPARATUS HAVING A LOCK MECHANISM

[75] Inventor: Masashi Nagano, Osaka, Japan

[73] Assignee: Shimano, Inc., Osaka, Japan

[21] Appl. No.: 927,226

[22] Filed: Aug. 10, 1992

[51] Int. Cl.$^5$ .............................................. B60B 27/00
[52] U.S. Cl. ................................... 301/110.5; 301/111
[58] Field of Search ............... 301/105 B, 105 R, 111, 301/114, 124 R; 411/8, 9, 10, 272, 273, 432; 403/27; 70/225, 233

[56] References Cited

U.S. PATENT DOCUMENTS

| | | | |
|---|---|---|---|
| 4,114,409 | 9/1978 | Scire | 70/223 X |
| 4,724,692 | 2/1988 | Turnin et al. | |
| 4,763,957 | 8/1988 | Poehlmann et al. | 301/111 X |
| 4,770,011 | 9/1988 | Constant | 301/111 X |
| 4,964,287 | 10/1990 | Gaul | |

Primary Examiner—Russell D. Stormer
Attorney, Agent, or Firm—Dickstein, Shapiro & Morin

[57] ABSTRACT

A quick release apparatus for a bicycle includes a first clamp (6) mounted on one end of a drawbar (5) for acting on a bicycle frame (10), and a second clamp (9) mounted on the other end of the drawbar (5) for cooperating with the first clamp (6) to hold the frame (10) tightly therebetween. The second clamp (9) has a rotary cam (7) for moving the first clamp (6) and second clamp (9) relative to each other, and a rocking lever (8) for controlling the rotary cam (7). The rotary cam (7) is lockable to a tightening position by a locking element (14) which is switchable between a lock position and an unlock position. The locking element (14) is remains in the unlock position when a tightening force produced by the first clamp (6) and second clamp (9) approaching each other is less than a predetermined value. The locking element (14) is automatically switched to the lock position when the tightening force reaches the predetermined value.

6 Claims, 23 Drawing Sheets

QUICK RELEASE APPARATUS HAVING A LOCK MECHANISM

BACKGROUND OF THE INVENTION

1. Field of the Invention

The present invention relates to quick release apparatus for use in securing wheels to bicycles, for example. Such an apparatus comprises a drawbar extending axially; a first clamp and a second clamp mounted on said drawbar to be axially movable relative to each other between a tightening position and a release position; an operating lever connected to the drawbar for moving the clamps between the tightening position and release position; and a lock mechanism switchable between a lock position for prohibiting movement of the clamps from the tightening position to the release position, and an unlock position for allowing this movement.

2. Description of the Related Art

This type of quick release apparatus is known from U.S. Pat. No. 4,724,692, for example, which includes a lock mechanism for locking an operating lever to prevent inadvertent release of a tightening mechanism. This lock mechanism includes a key-operated cylinder having an engaging element for locking the operating lever to a tightening position. Thus, the lock mechanism provides locked and unlocked conditions of the operating lever.

Such a locking mechanism may be devised to be automatically switchable with movement of the operating lever to the tightening position, for locking the lever to the tightening position.

However, with the prior quick release apparatus noted above, the tightening force presented by the operating lever against clamps is not particularly related to the lock mechanism for locking the operating lever to a tightening position.

SUMMARY OF THE INVENTION

The object of the present invention is to provide a quick release apparatus whereby the lock mechanism for locking the operating lever to a tightening position is related to the tightening force presented by the operating lever against clamps.

The above object is fulfilled, according to the present invention, by a quick release apparatus comprising a drawbar extending axially; a first clamp and a second clamp mounted on the drawbar to be axially movable relative to each other between a tightening position and a release position; control means connected to the drawbar for moving the clamps between the tightening position and the release position; and lock means switchable between a lock position for prohibiting movement of the clamps from the tightening position to the release position, and an unlock position for allowing the movement, the lock means being switchable to the lock position when a tightening force of the clamps in the tightening position reaches a predetermined value, and remaining in the unlock position when the tightening force is less than the predetermined value.

The above predetermined value may be a tightening force required for a desired tight condition. When the control means is operated to the tightening position with the clamps attached to proper positions relative to the drawbar, the two clamps produce the tightening force required, whereby the lock means is automatically switched to the lock position to lock the control means. This locked condition is perceived by the feel of the hand sensing the switching of the lock means, by the switching action or switching sound, or by the fact that the control means is not movable to the original position. Thus, the cyclist may determine that the tightening operation has been successful.

When the control means is operated to the tightening position with the clamps attached to improper positions relative to the drawbar, the two clamps produce no or insufficient tightening force. In this case, the lock means remains in the unlock position, leaving the control means unlocked. This unlocked condition may be perceived by the feel of the hand or with the eyes sensing non-switching of the lock means, or by the fact that the control means is movable to the original position. Thus, the cyclist may determine that the tightening operation has not produced any tightening effect or a tightening force less than the required tightening force. In the event of no or insufficient tightening result, the cyclist may operate the control means back to the original position, and adjust one or both of the clamps to a proper position or positions relative to the drawbar.

Thus, the cyclist may readily determine, from switching of the lock means from the unlock position to the lock position, whether the tightening force has reached a required tightening force or not. When operation of the control means to the tightening position results in a sufficient tightening force, the control means is automatically locked to maintain the tight condition positively and with ease. When the tightening force produced requires adjustment, the control means remains unlocked and may just be returned to the original position without necessitating a special unlocking operation.

Other features and advantages of the present invention will be apparent from the description of the preferred embodiments to be had with reference to the drawings.

DETAILED DESCRIPTION OF THE PREFERRED EMBODIMENTS

Figure 1:
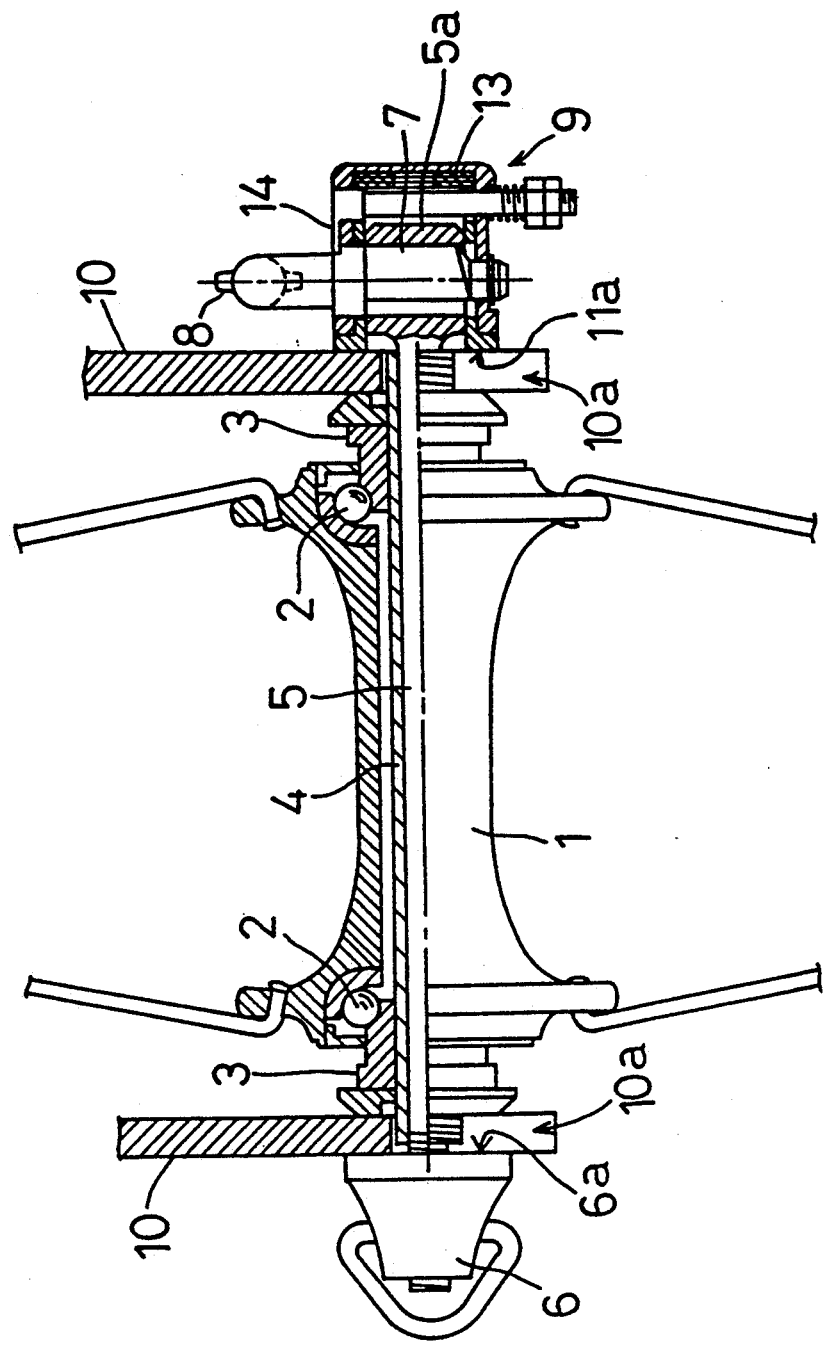
FIG. 1 is a front view, partly in section, of a quick release apparatus in a first embodiment of the present invention.

As shown in FIG. 1, a hub assembly 1 is supported on a hollow axle 4 through balls 2 and ball retainers 3. A quick release apparatus includes a drawbar 5 extending axially through the hollow axle 4. A first clamp 6 in the form of a nut is axially adjustably mounted on one end of the drawbar 5. A second clamp 9 is adjustably fixed to the other end of the drawbar 5. The second clamp 9 contains a tightening rotary cam 7 formed on an end region curved substantially 90 degrees of a rocking lever 8. As seen in FIG. 1, the quick release apparatus is attached to a pair of bicycle frames 10, with the hub assembly 1 mounted between the two frames 10 and opposite ends of the axle 4 fitted in mounting cutouts 10a formed in the frames 10. The first clamp 6 has a knurled abutting surface 6a contacting an outer surface of one of the frames 10, while the second clamp 9 has a knurled abutting surface 11a contacting an outer surface of the other frame 10. The quick release apparatus is switchable with rotation of the rotary cam 7 caused by operation of the rocking lever 8, between a position to tighten the hub assembly 1 to the bicycle frames 10 so that a wheel is rotatably supported by the frames 10, and a position to loosen the hub assembly 1 from the frames 10 so that the wheel is removable from the frames 10.

Figure 2:
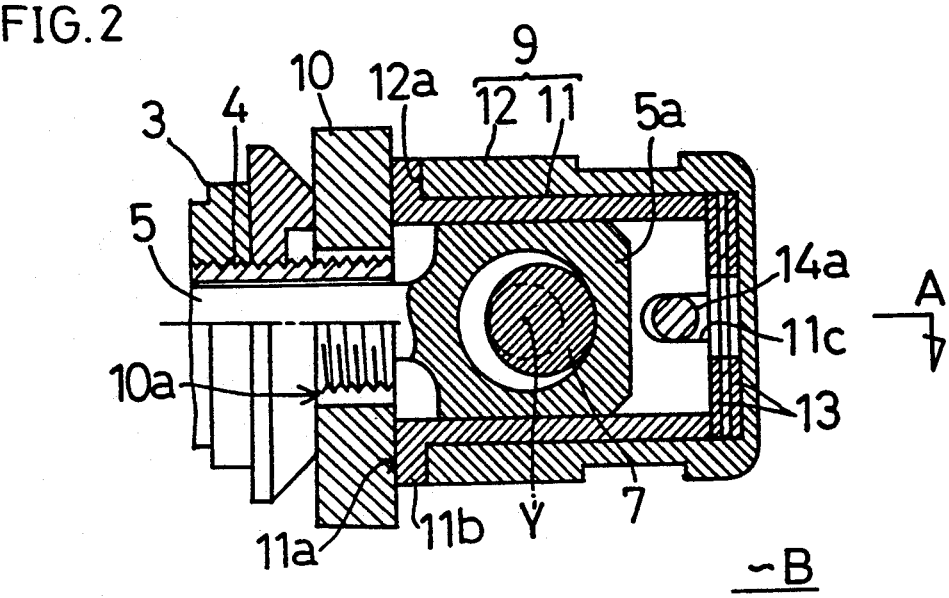
FIG. 2 is a sectional plan view of a clamp in a tightening position.
Figure 3:
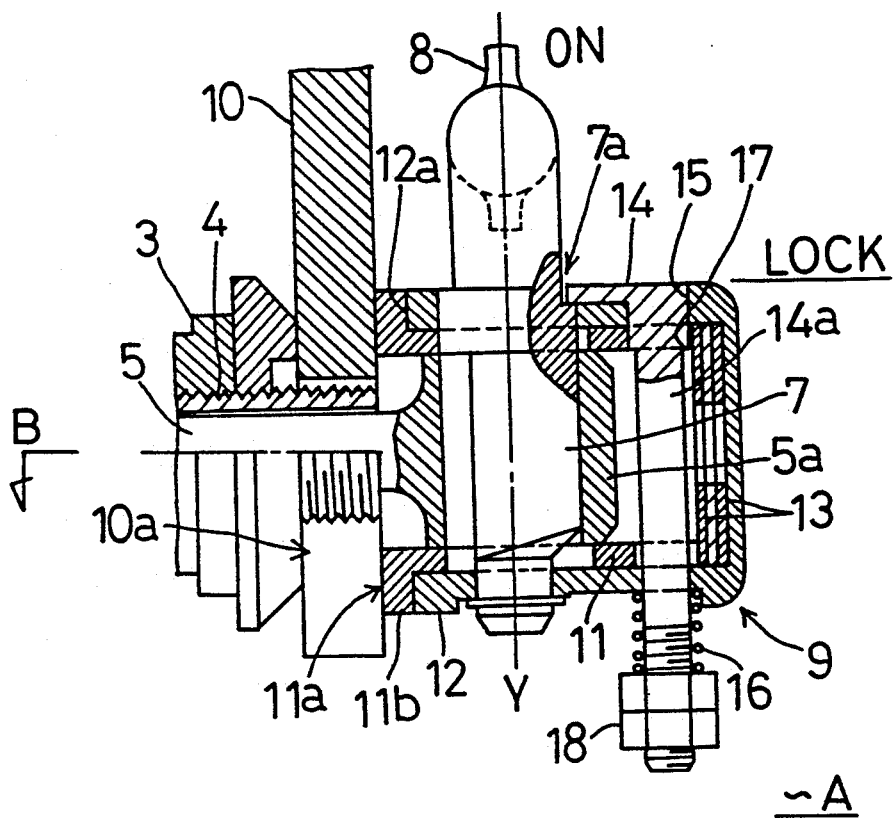
FIG. 3 is a sectional front view of a locking mechanism in a lock position.

Specifically, as shown in FIG. 2, the second clamp 9 includes a presser 11 defining the abutting surface 11a and slidably mounted on a cam follower 5a formed on an end of the drawbar 1, and a housing 12 slidably mounted on the presser 11. The rotary cam 7 extends through the cam follower 5a and presser 11 and is pivotally connected to the housing 12 to be rotatable about an axis Y extending substantially perpendicular to an axis of the drawbar 5. As shown in FIG. 3, the rotary cam 7 is in the form of a cylinder integral with the rocking lever 8 and placed eccentrically with respect to the axis Y, so that the rotary cam 7 makes eccentric movement when the lever 8 is turned about the axis Y.

Figure 4:
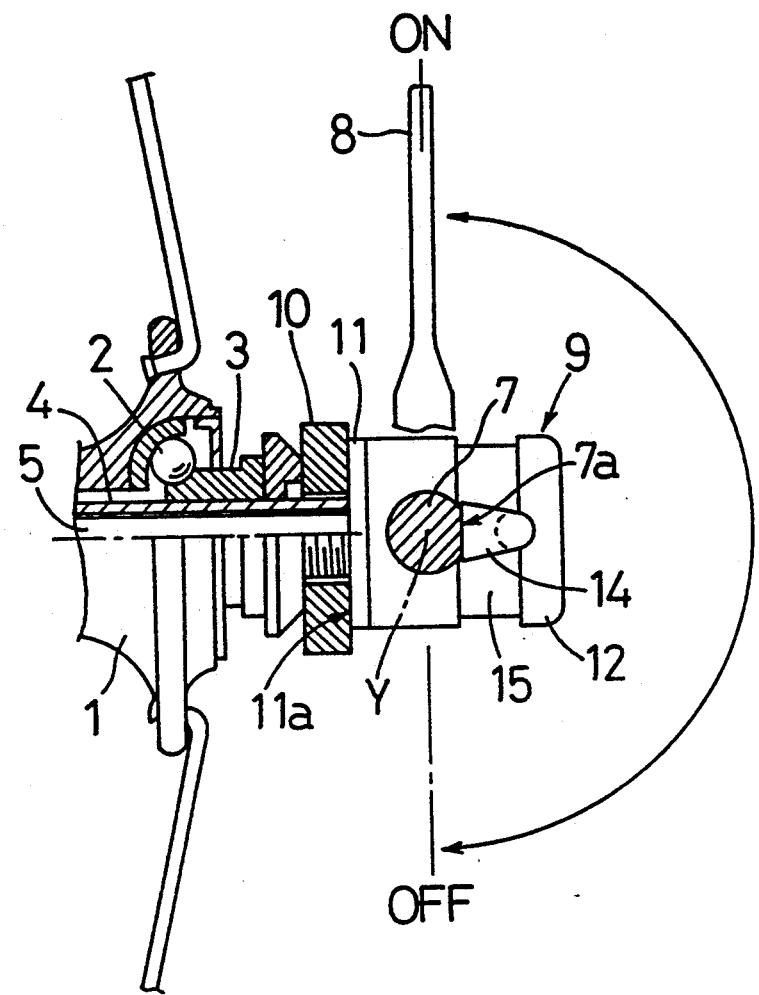
FIG. 4 is a plan view of the clamp and a lever.

When the rocking lever 8 is turned to a tightening position: ON as shown in FIGS. 3 and 4, the rotary cam 7 moves to a tightening position shown in FIG. 2 where a point of contact between the cam 7 and cam follower 5a is at a maximum distance to the axis Y to slide the drawbar 5 toward the presser 11. Further, a reaction of this sliding movement acts on the rotary cam 7 to place the second clamp 9 in a clamping position with a flange 11b of the presser 11 and an end face 12a of the housing 12 drawn toward each other. As a result, the distance between the first clamp 6 and second clamp 9 is reduced to clamp the frames 10 and hub assembly 1 between the abutting surfaces 6a and 11a.

Figure 5:
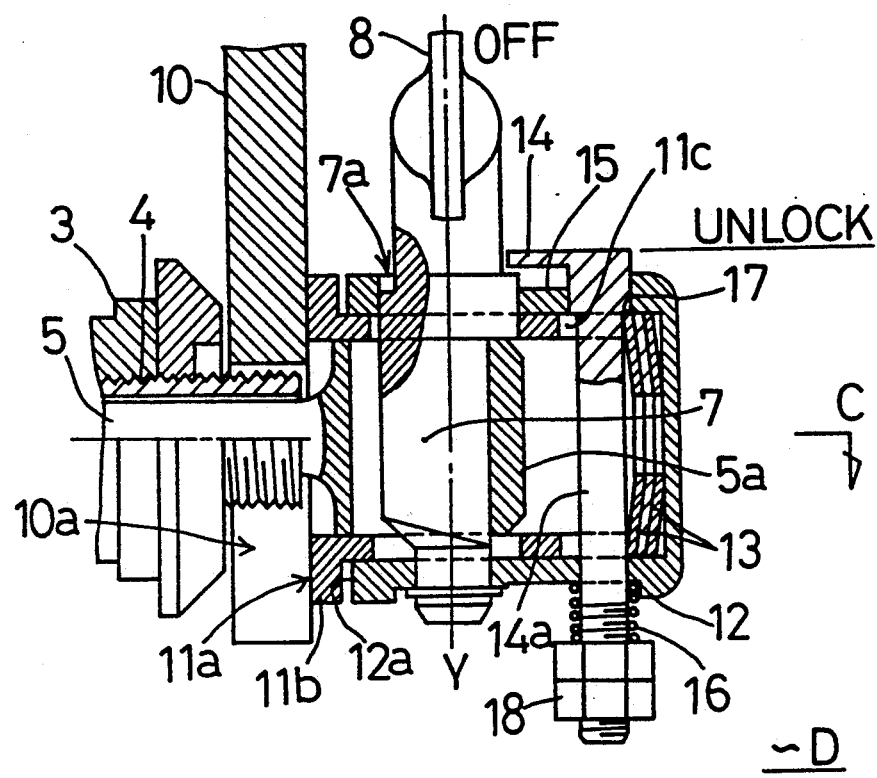
FIG. 5 is a sectional front view of the locking mechanism in an unlock position.
Figure 6:
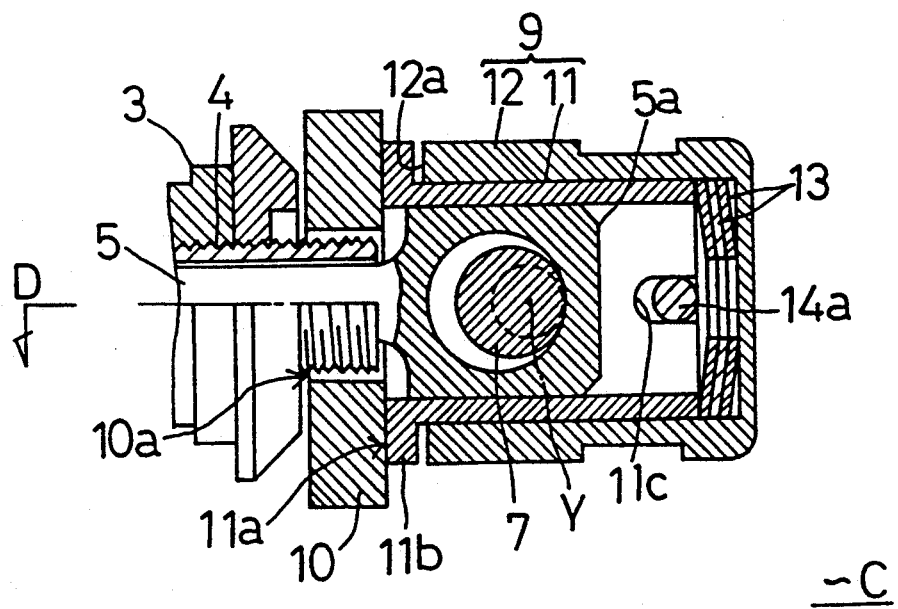
FIG. 6 is a sectional plan view of the clamp in a release position.

When the rocking lever 8 is turned to a release position: OFF as shown in FIG. 5, the rotary cam 7 moves to a release position shown in FIG. 6 where the point of contact between the cam 7 and cam follower 5a is at a minimum distance to the axis Y. At this time, the second clamp 9 moves to a release position under an urging force of a plurality of disc springs 13 arranged between the presser 11 and housing 12, with the flange 11b of the presser 11 and the end face 12a of the housing 12 spaced from each other as shown in FIGS. 5 and 6. As a result, the distance between the first clamp 6 and second clamp 9 is increased to loosen the frames 10 and hub assembly 1.

The first clamp 6 is screwed to the drawbar 5 to be positionally adjustable. Therefore, even if the wheel is attached to bicycle frames having a different thickness, the rotary cam 7 may impart a required tightening force after positionally adjusting the first clamp 6.

As shown in FIG. 3, a locking element 14 for acting on the rotary cam 7 has a mounting shaft portion 14a for slidable attachment to the housing 12. The locking element 14 is slidable between a lock position as shown in FIGS. 3 and 4 and an unlock position as shown in FIG. 5. In the lock position, the locking element 14 enters an annular groove 15 of the housing 12 and a cutout 7a formed in a boss of the rotary cam 7. As a result, the rotary cam 7 is locked to the tightening position by contact between a working end surface of the locking element 14 and an engaging surface of the rotary cam 7. In the unlock position, the locking element 14 is outside the annular groove 15 away from the boss of the rotary cam 7 for allowing rotation of the rotary cam 7.

In response to a tightening force of the quick release apparatus, the locking element 14 is movable from the unlock position to the lock position by means of a lock urging spring 16 acting on the mounting shaft portion 14a, the disc springs 13 and the housing 12. That is, the locking element 14 remains in the unlock position when a tightening force produced by the first clamp 6 and second clamp 9 approaching each other is less than a predetermined force required for securely holding the wheel. When the tightening force reaches the predetermined force, the locking element 14 is automatically switched to the lock position. Consequently, when the first clamp 6 is attached to a proper position, the rotary cam 7 rotated to the tightening position is automatically lockable to that position. When the first clamp 6 is not attached to the proper position, the rotary cam 7 rotated to the tightening position remains unlocked. Thus, the apparatus may be locked to the tightening position only by operating the rocking lever 8. It is also possible to determine whether the tightening force has reached the predetermined force by utilizing a device that indicates switching of the locking element 14.

Figure 7:
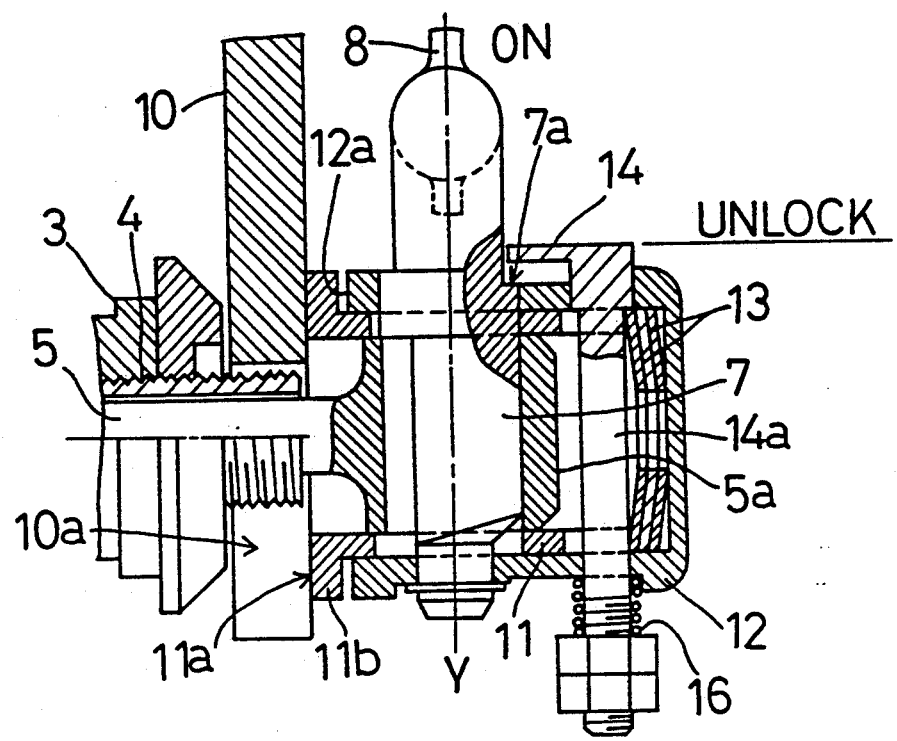
FIG. 7 is a sectional front view of the clamp with the locking mechanism remaining in the unlock position.

The above predetermined force is provided by the disc springs 13. When no or insufficient tightening force is produced despite the rotary cam 7 being in the tightening position, no or little reaction acts on the rotary cam 7. In this case, as shown in FIG. 7, the disc springs 13 maintain the end face 12a of the housing 12 out of contact with the flange 11b of the presser 11. The disc springs 13 engage a step 17 of the mounting shaft portion 14a to produce a stopper function, whereby the locking element 14 remains in the unlock position despite the force of the lock urging spring 16.

When a tightening force equal to or exceeding the predetermined force is produced by the switching of the rotary cam 7 to the tightening position, the reaction acting on the rotary cam 7 causes the housing 12 to slide against the force of the disc springs 13 until the end face 12a approaches the flange 11b of the presser 11 as shown in FIG. 3. As a result of the slide of the housing 12, the mounting shaft portion 14a of the locking element 14 moves within a pair of shaft receiving cutouts 11c of the pressure 11 toward the rotary cam 7. Thus, the step 17 moves out of engagement with the disc springs 13, whereupon the locking element 14 is switched to the lock position under the force of the lock urging spring 16.

For unlocking the rotary cam 7 from the tightening position, the mounting shaft portion 14a is manually caused by means of a control element 18 mounted thereon to slide against the force of the lock urging spring 16. This manual operation switches the locking element 14 from the lock position to the unlock position to render the rotary cam 7 rotatable.

Figure 8:
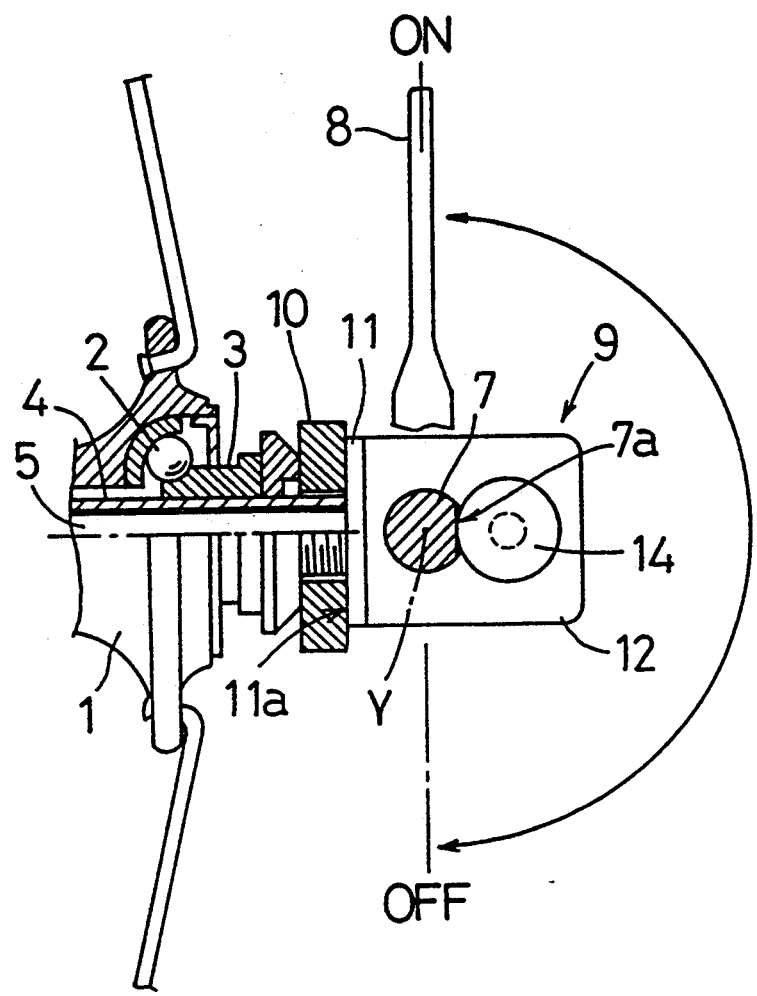
FIG. 8 is a plan view, partly in section, of a locking mechanism in a second embodiment of the invention.
Figure 9:
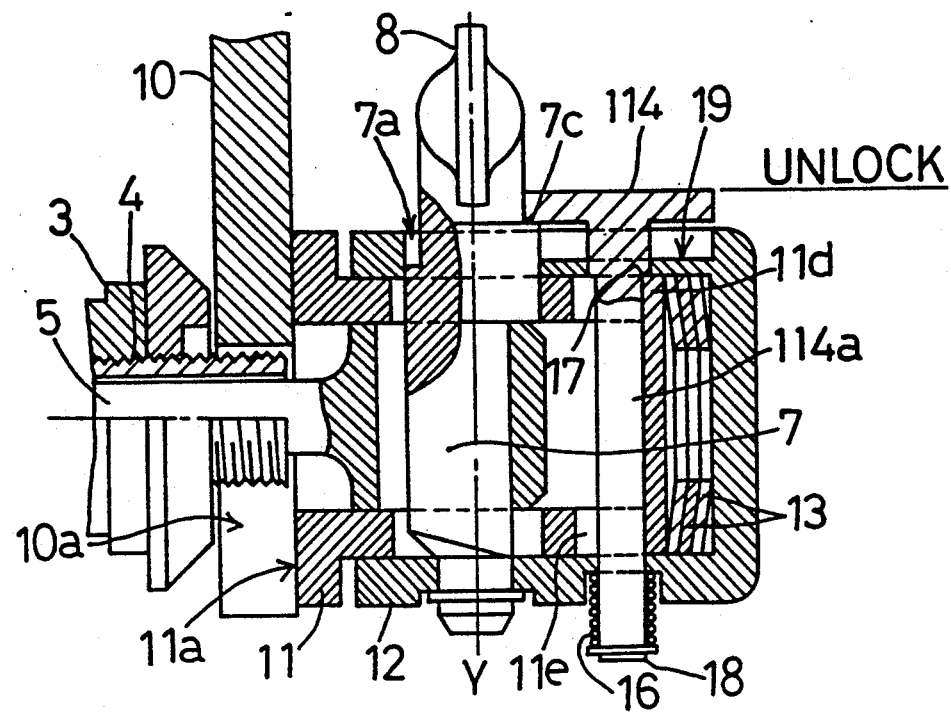
FIG. 9 is a sectional side view of the locking mechanism of FIG. 8 in an unlock position.
Figure 10:
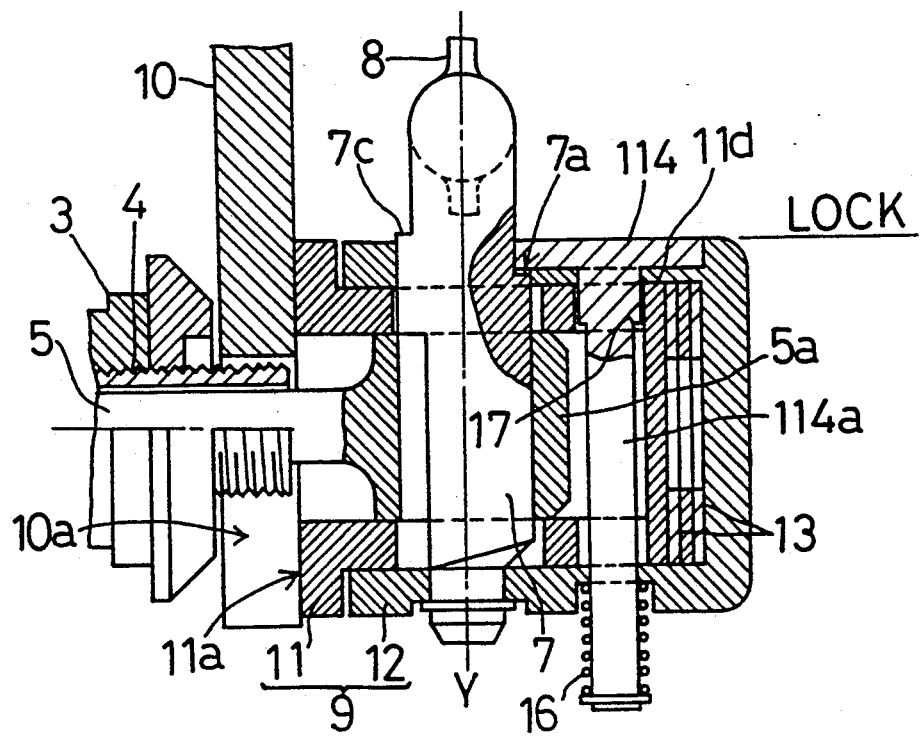
FIG. 10 is a sectional side view of the locking mechanism of FIG. 8 in a lock position.

FIGS. 8 through 10 shown a locking mechanism in a second embodiment of the invention, in which a locking element 114 is slidable to a lock position entering a recess 19 formed in the housing 12 and the cutout 7a formed in the boss of the rotary cam 7. In this position, the rotary cam 7 is locked to the tightening position by contact between a peripheral portion of the locking element 114 and an engaging surface of the boss of the rotary cam 7.

When the rotary cam 7 is in the release position, the locking element 114 is maintained in an unlock position, with a stopper portion 7c of the boss of the rotary cam 7 contacting the locking element 114, and a stopper portion 11d of the presser 11 contacting a step 17 of a mounting shaft portion 114a. When the rotary cam 7 is in the tightening position but its tightening force is less than the predetermined force, the locking element 114 is maintained in the unlock position only by the stopper portion 11d of the presser 11. The presser 11 defines shaft receiving bores 11e having a greater diameter than the mounting shaft portion 114a, which allow the locking element 114 to slide with the housing 12 when the tightening force produced is equal to or greater than the predetermined force.

FIGS. 11 through 21 show a locking mechanism in a third embodiment of the invention, in which a locking element 214 acts as the main component thereof.

Figure 11:
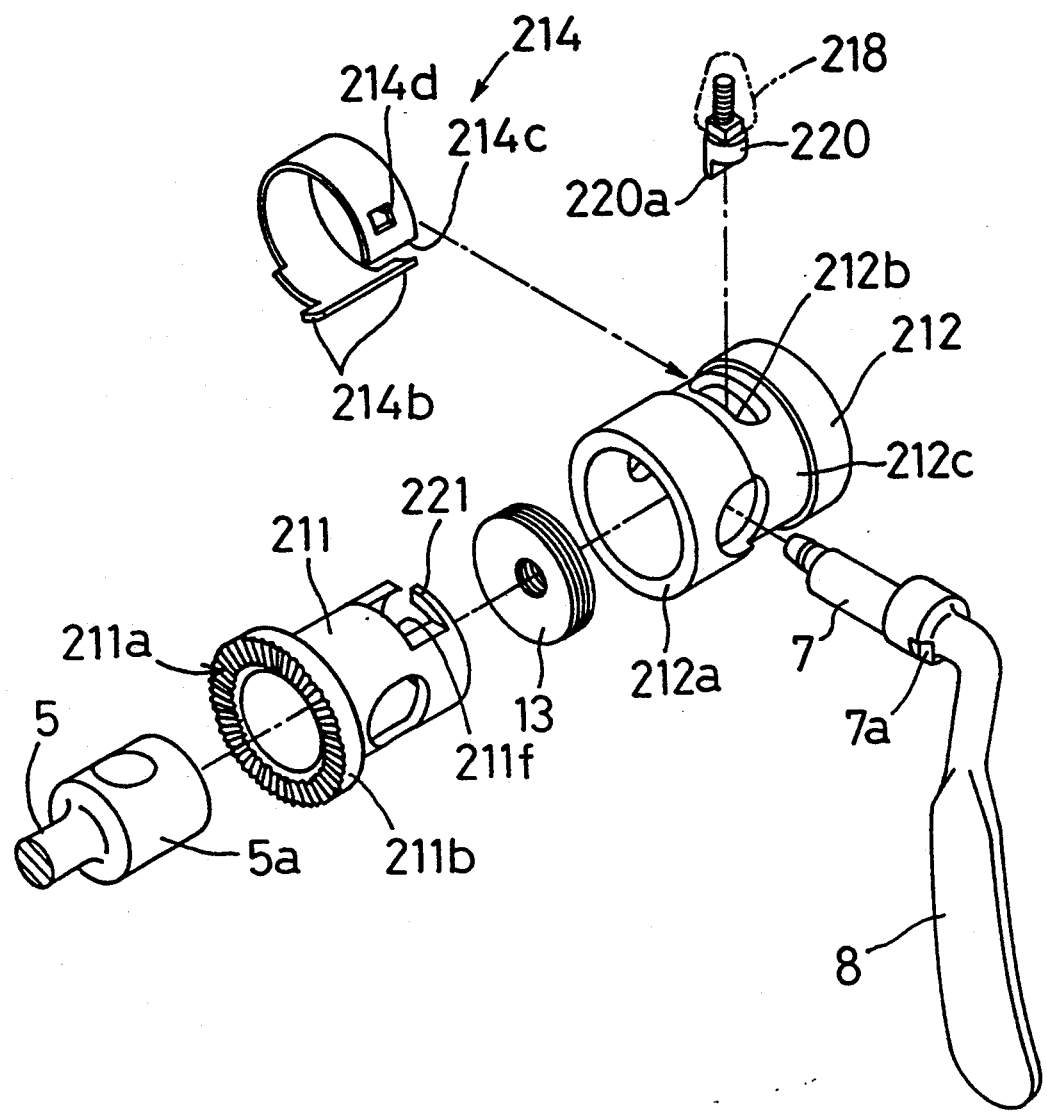
FIG. 11 is an exploded perspective view of a locking mechanism in a third embodiment of the invention.
Figure 12:
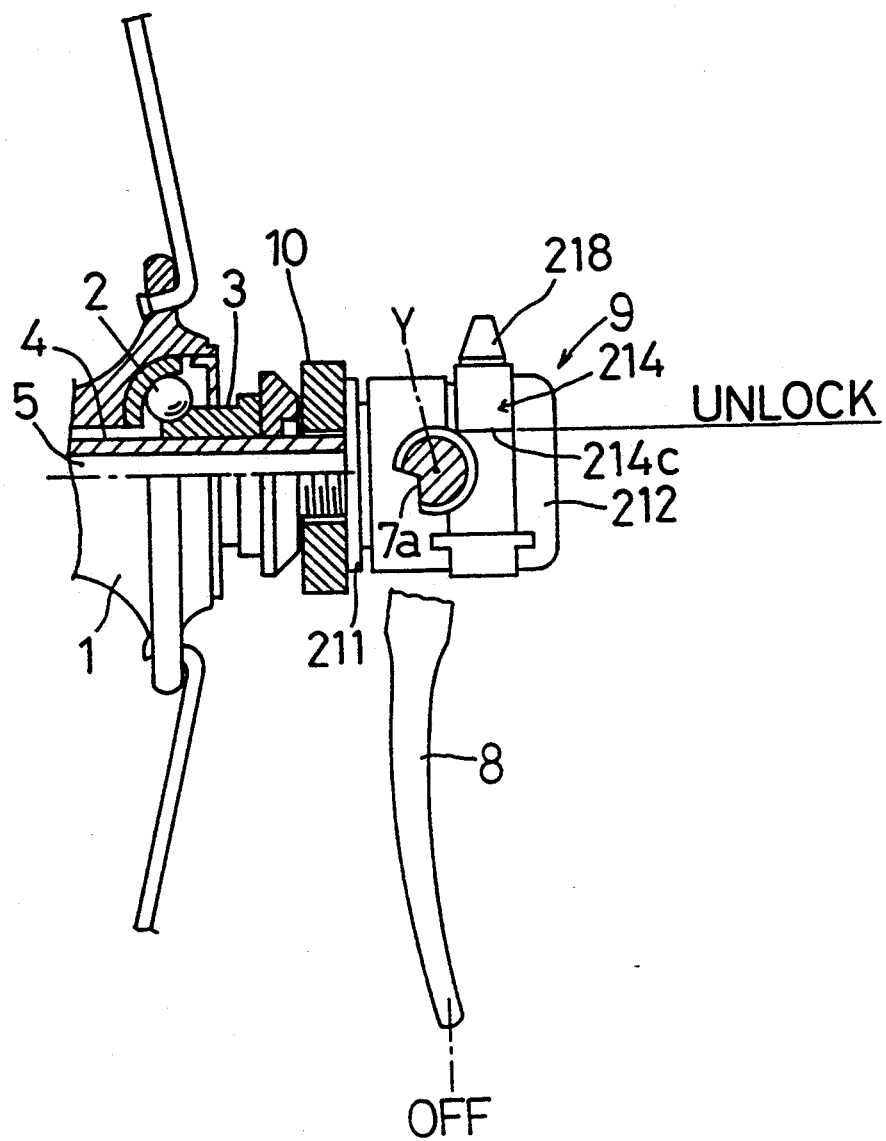
FIG. 12 is a plan view, partly in section, of the locking mechanism of FIG. 8 in an unlock position.

As seen from FIG. 11, the locking element 214 comprises a rolled spring mounted on an annular groove 212c formed in a housing 212. A guide 220 is provided for movement of the locking element 214 between a lock position and an unlock position. The rolled spring acting as the locking element 214 has mounting pieces 214b projecting transversely from opposite sides at one end thereof. The mounting pieces 214b engage recesses formed as extensions from the annular groove 212c to retain the locking element 214 on the housing 212. The other end of the locking element 214 acts as an engaging portion 214c for engaging a cutout 7a formed in a rocking lever 8 to lock the lever 8. The lever 8 is unlocked when the locking element 214 is expanded to separate the engaging portion 214c from the cutout 7a of the lever 8. The lever 8 is locked when the locking element 214 is returned to the original position by its own elastic restoring force to engage the engaging portion 214c with the cutout 7a. The locking element 214 defines a rectangular perforation 214d for receiving the guide 220. Consequently, the engaging portion 214c of the locking element 214 is displaceable together with the guide 220. The guide 220 has a lower portion thereof extending through a peripheral slot 212b of the housing 212 to a key-like cutout 211f defined in an end region remote from a flange 211b of a presser 211. As seen from FIG. 11, a projection 221 extends in a circumferential direction along an end plane into the cutout 211f. As described later, this projection 221 acts as a stopper for preventing an engaging projection 220a of semicircular section formed on the lower portion of the guide 220 from moving in the circumferential direction under the elastic restoring force of the locking element 214. The guide 220 has a screw formed on an upper portion thereof, to which a control element 218, as shown only in contour in a two-dot-and-dash line, is screwed tight for convenience of a manual operation.

Figure 13:
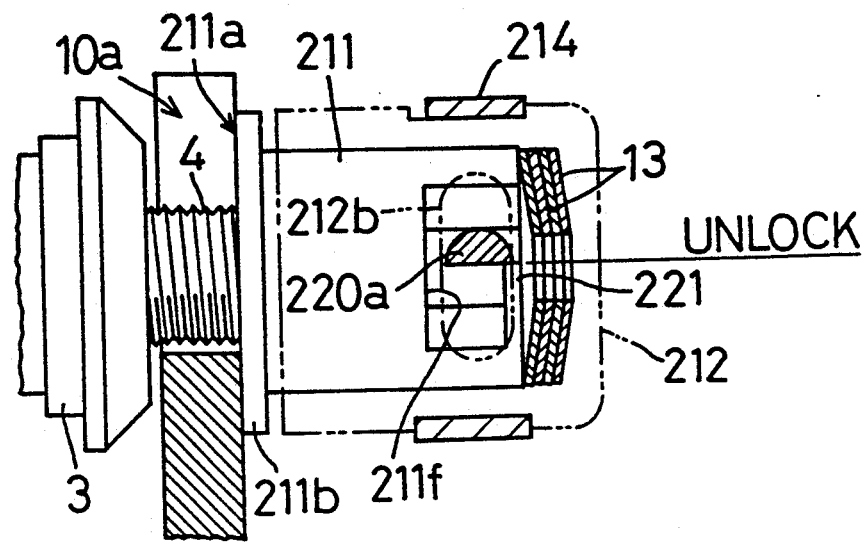
FIG. 13 is a schematic view of the locking mechanism of FIG. 8 in the unlock position showing a relationship between a stopper formed on a presser and an engaging projection of a guide.
Figure 14:
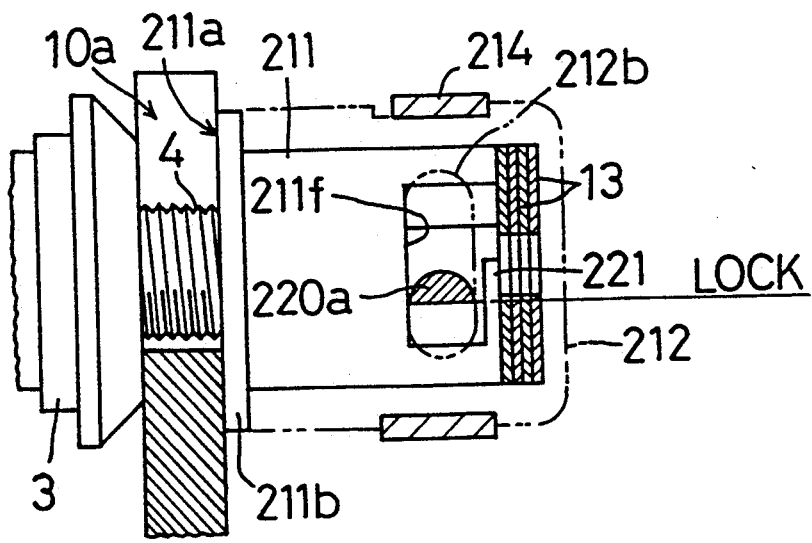
FIG. 14 is a schematic view of the locking mechanism of FIG. 8 in the lock position showing a relationship between the stopper and engaging projection.

When the locking element 214 is moved to the unlock position by means of the control element 218 with the rocking lever 8 placed in an OFF position (FIG. 12), the housing 212 and presser 211 move relative to each other under the elastic restoring force of disc springs 13, to separate an end face 212a of the housing 212 and the flange 211b of the presser 211. Then, as shown in FIG. 13, the stopper 221 contacts the engaging projection 220a and checks elastic restoration of the locking element 214 to maintain the locking element 214 in the unlock position. When the engaging projection 220a disengages from the stopper 221 as shown in FIG. 14, the locking element 214 moves circumferentially under the restoring force to place the engaging portion 214c in the lock position. At this time, the engaging projection 220a is retracted to a deep end of the cutout 211f as shown in FIG. 14.

Figure 15:
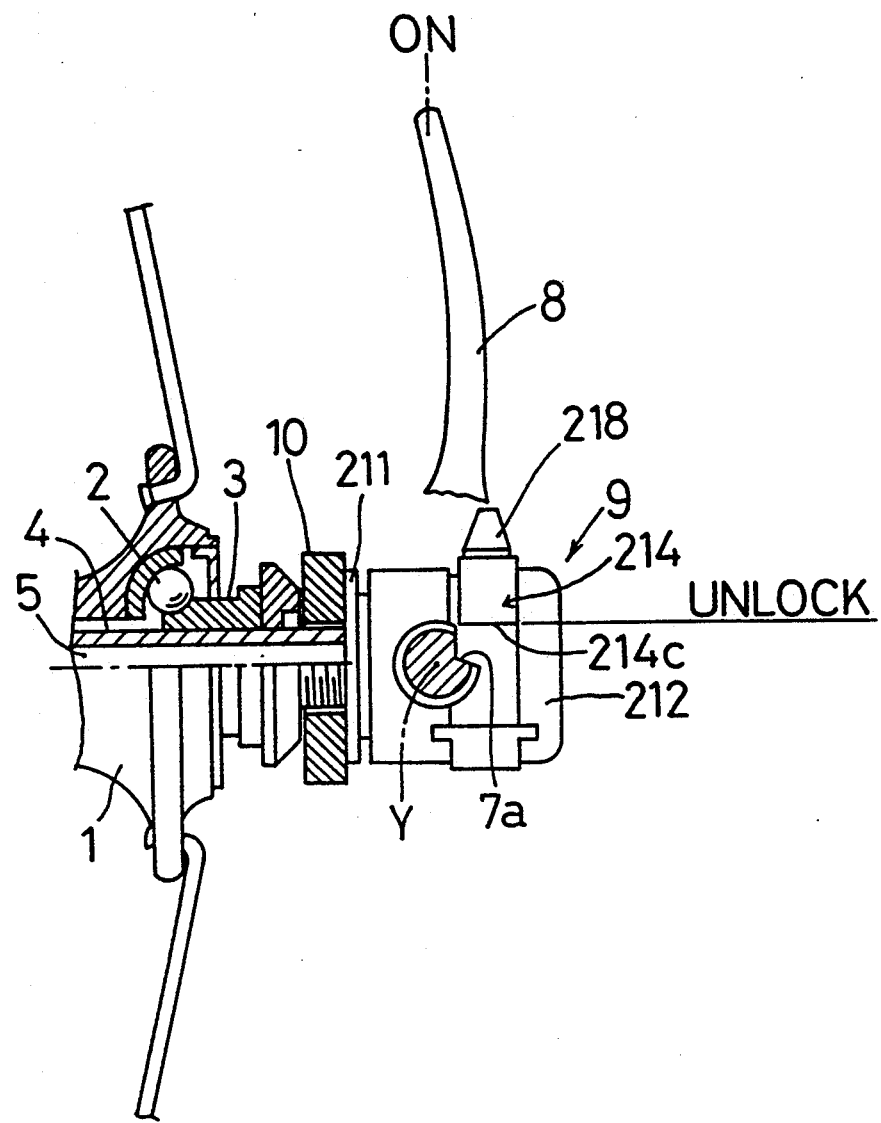
FIG. 15 is a plan view, partly in section, of the locking mechanism of FIG. 8 in the unlock position with a lever placed in a tightening position.
Figure 16:
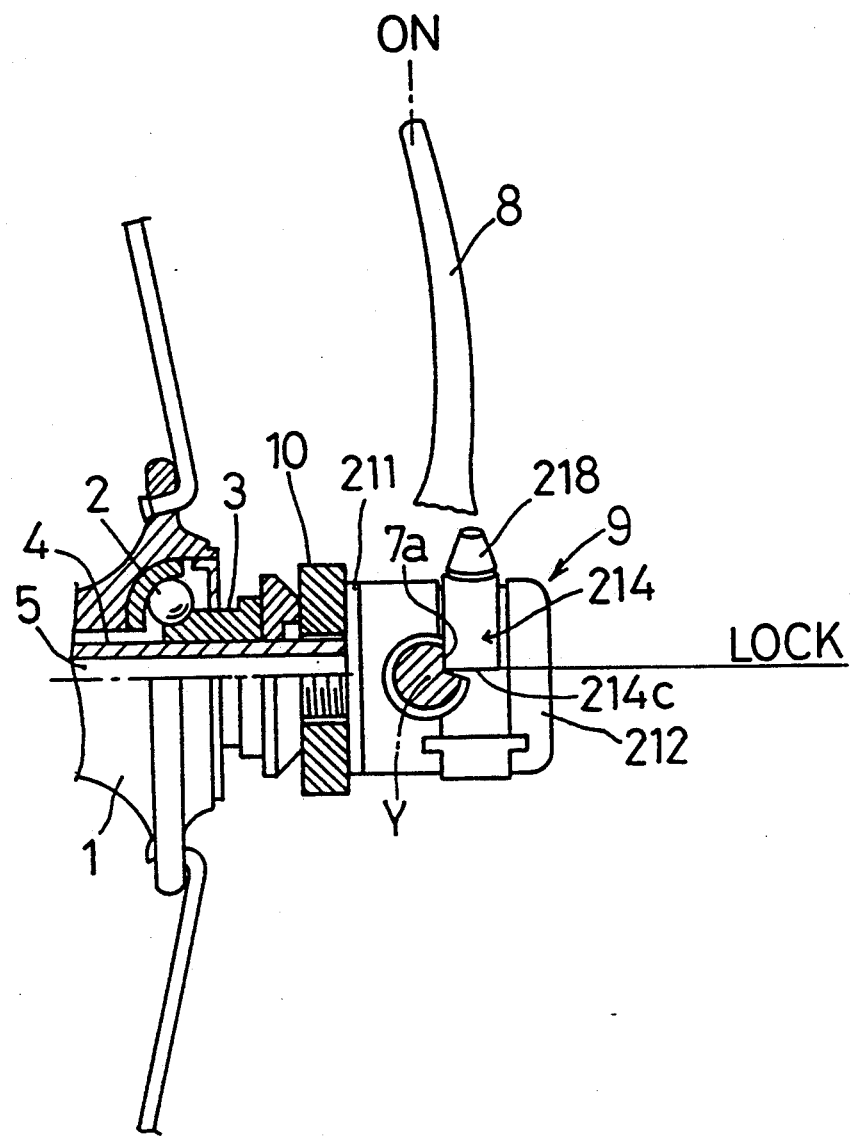
FIG. 16 is a plan view, partly in section, of the locking mechanism of FIG. 8 in the lock position with a lever placed in the tightening position.

The rocking lever 8, and thus the rotary cam 7, is turned with the locking element 214 maintained in the unlock position by the stopper 221. If no or insufficient tightening force is produced by switching of the rotary cam 7 to the tightening position, the disc springs 13 maintain the housing 212 in the position having the end face 212a spaced from the flange 211b of the presser 211, as shown in FIG. 15, since no or little tightening reaction acts on the rotary cam 7. The locking element 214 is maintained in the unlock position by the action of the stopper 221 in spite of the elastic force of the locking element 214.

When the rotary cam 7 switched to the tightening position produces a tightening force equal to or greater than the predetermined force, the reaction acting on the rotary cam 7 causes the housing 212 to slide against the force of the disc springs 13 until the end face 212a approaches the flange 211b of the presser 211 as shown in FIG. 15. The locking element 214 also moves with the housing 212 relative to the presser 211. As a result, the engaging projection 220a of the guide 220 moves out of engagement with the stopper 221, whereupon the locking element 214 is switched to the lock position under its own restoring force.

For unlocking the rotary cam 7 from the tightening position, the locking element 214 is manually displaced in the circumferential direction by means of the control element 218. This manual operation switches the locking element 214 from the lock position to the unlock position, and the stopper 221 acts to place the rotary cam 7, and thus rocking lever 8, in the condition for a turning operation.

Figure 17:
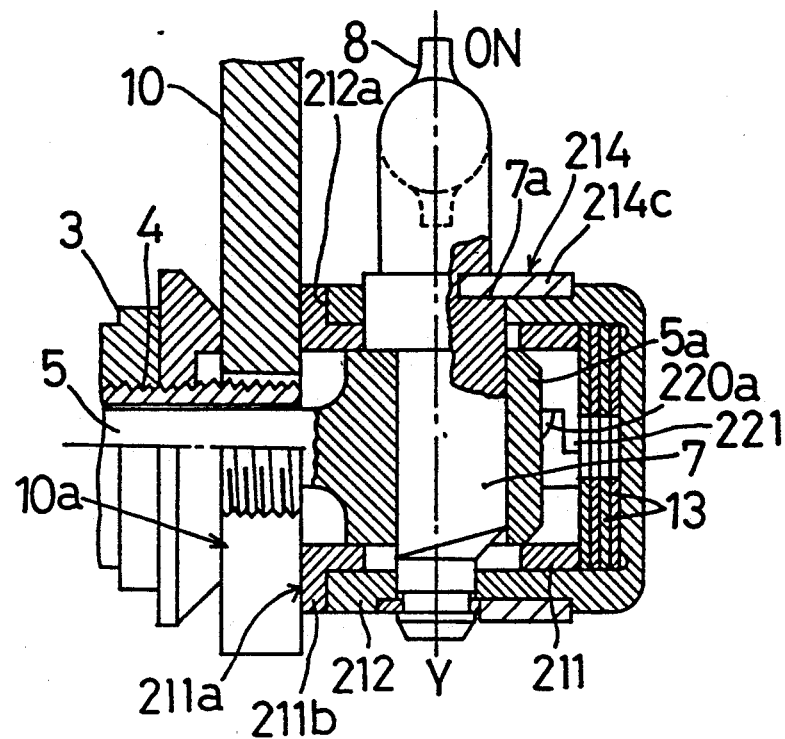
FIGS. 17 and 18 are explanatory views, partly in section, showing various elements of the lock mechanism of FIG. 11 in the lock position.
Figure 18:
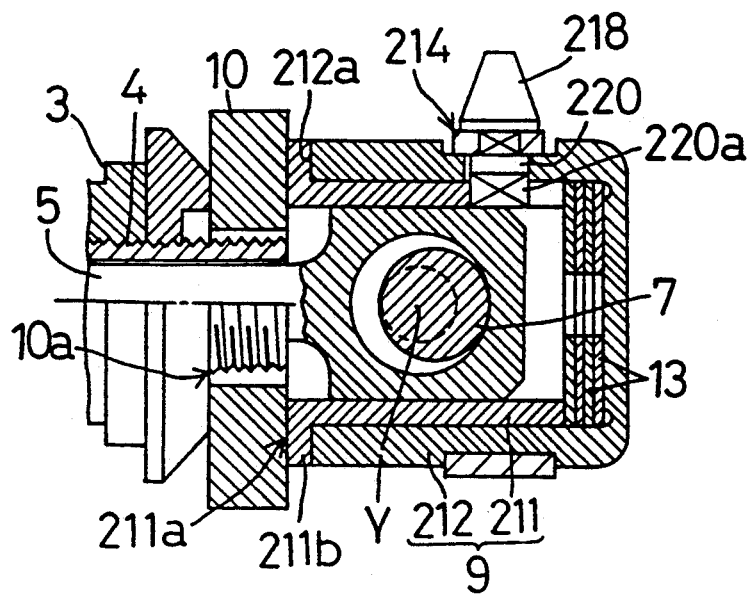
Figure 19:
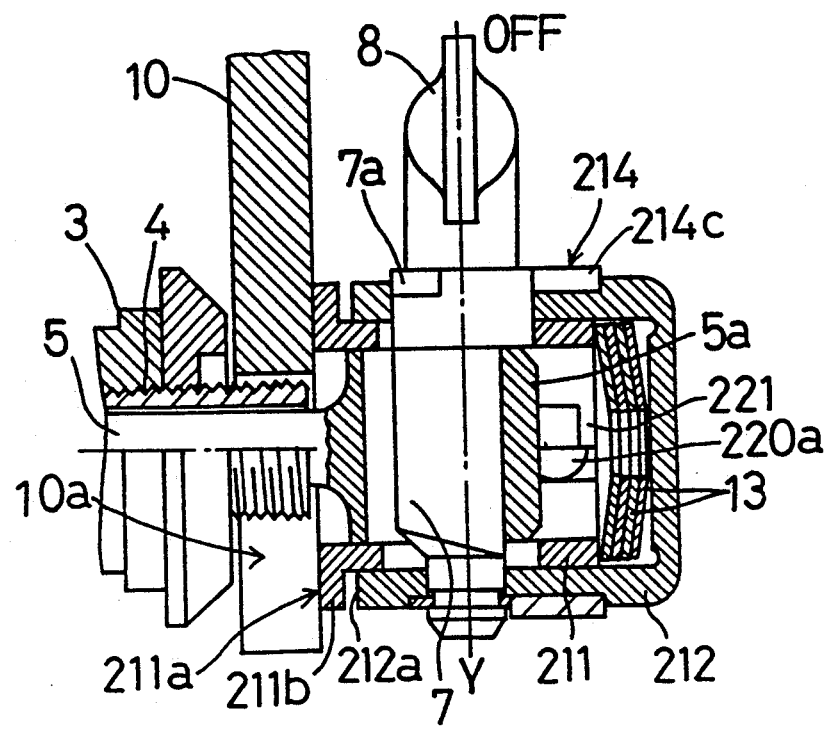
FIGS. 19 through 21 are explanatory views, partly in section, showing various elements of the lock mechanism of FIG. 11 in the unlock position.
Figure 20:
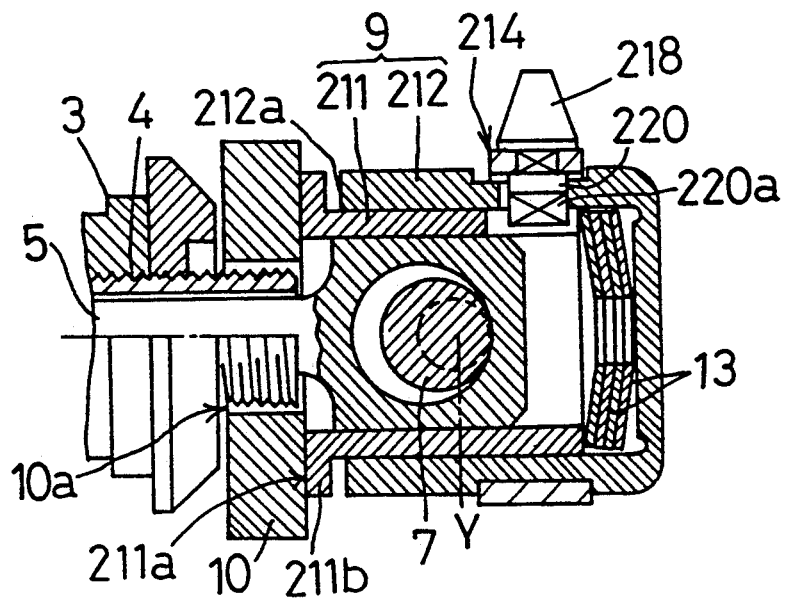
Figure 21:
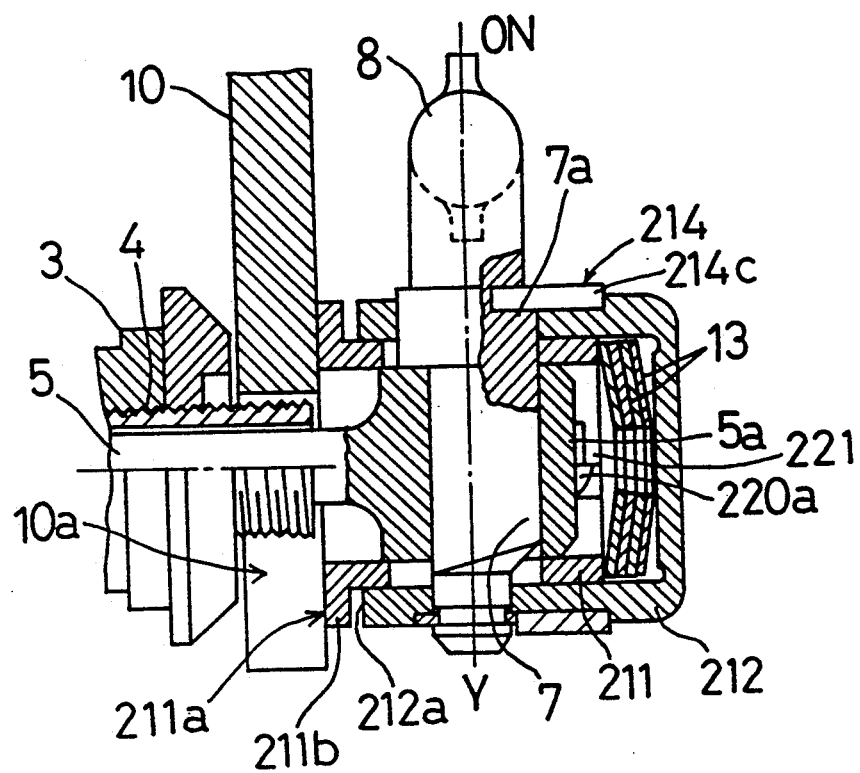

FIGS. 17 through 21 are explanatory views partly in section for facilitating understanding of the lock position and unlock position of the lock mechanism in this embodiment. FIGS. 17 and 18 show the lock position while FIGS. 19 through 21 show the unlock position.

FIGS. 22 through 28 show a locking mechanism in a fourth embodiment of the invention, in which a locking element 314 acts as the main component thereof.

Figure 22:
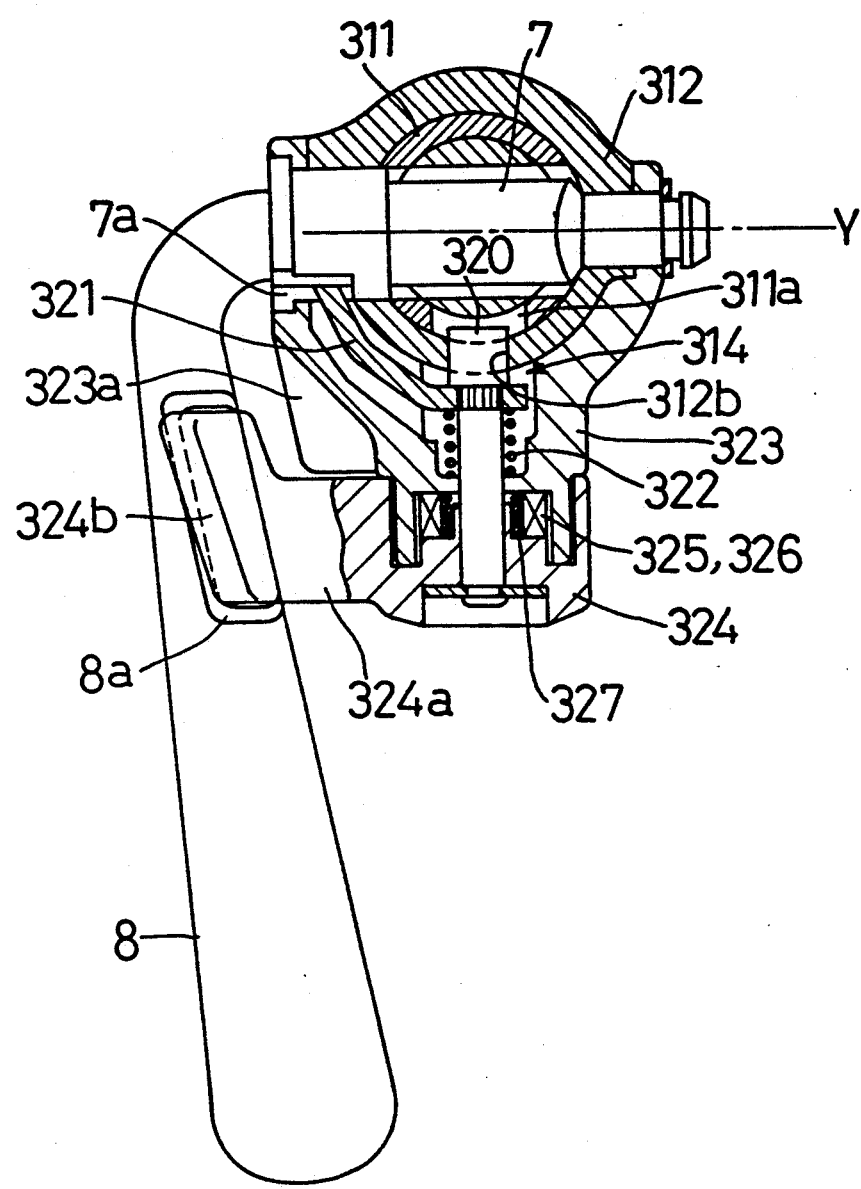
FIG. 22 is a view, partly in section, of a locking mechanism in a fourth embodiment of the invention.

As seen from FIG. 22, the locking element 314 includes a pin 320 slidable in directions perpendicular to a rotational axis Y of a rotary cam 7, and an engaging member 321 operatively connected to the pin 320. The engaging member 321 has a distal end shaped to engage a cutout 7a formed in a rocking lever 8, thereby to lock the lever 8, and thus the rotary cam 7, against displacement. That is, the locking element 314 is switchable between a lock position in which the pin 320 is caused to slide toward the rotary cam 7 to engage the cutout 7a, and an unlock position in which the pin 320 is caused to slide away from the rotary cam 7 to disengage from the cutout 7a.

A housing 312 and a presser 311 define outer perforation 312b and an inner perforation 311a, respectively, to allow a forward end of the pin 320 to move through the housing 312 and presser 311 when the pin 320 slides toward the rotary cam 7.

The pin 320 includes a shank portion having a smaller diameter than the forward portion thereof. The engaging member 321 is fitted to a step defined between the forward portion and shank portion, and is pressed against the step by a compression spring 322. The other end of the spring 322 is in contact with a casing 323. Thus, the locking element 314, namely the pin 320 and engaging member 321, are urged toward the lock position. The shank portion of the pin 320 defines a cam follower 326 cooperating with a cam 325 formed on a release lever 324 supported by the casing 323 to be pivotable about the pin 320. The cam 325 and cam follower 326 are shaped to displace the pin 320 from lock position to unlock position with pivotal movement of the release lever 324 from home position to release position, and to pivot the release lever 324 from release position to home position with sliding movement of the pin 320 from unlock position to lock position. The release lever 324 includes a control portion formed in a forward region of an arm portion extending perpendicular to an axis of the pin 320. The release lever 324 is urged to the release position by a coil spring 327.

The lock mechanism in this embodiment operates as follows.

Figure 23:
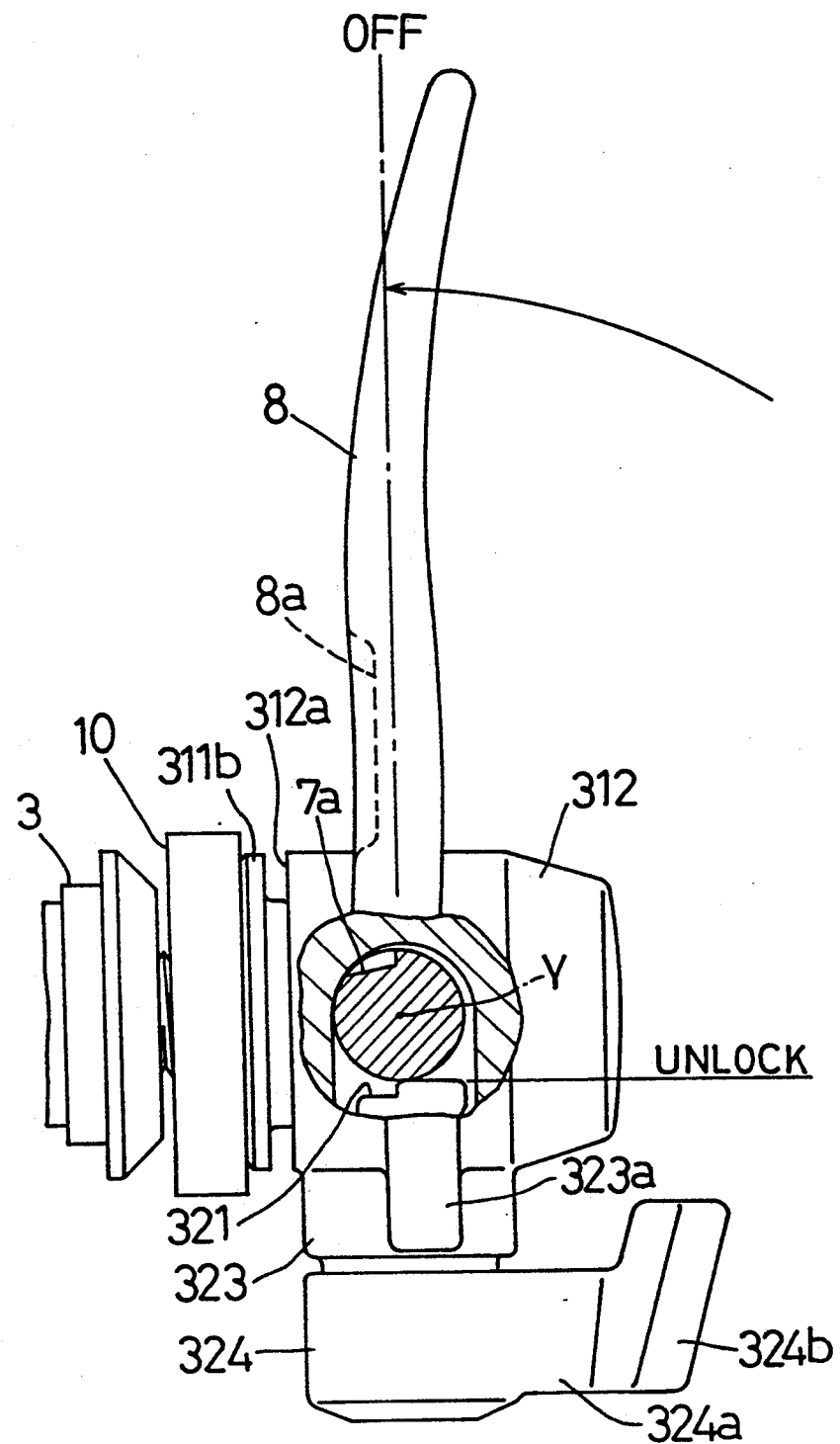
FIG. 23 is a view, partly in section, of the locking mechanism of FIG. 22 in an unlock position, showing position of an engaging member with a lever placed in an OFF position.
Figure 24:
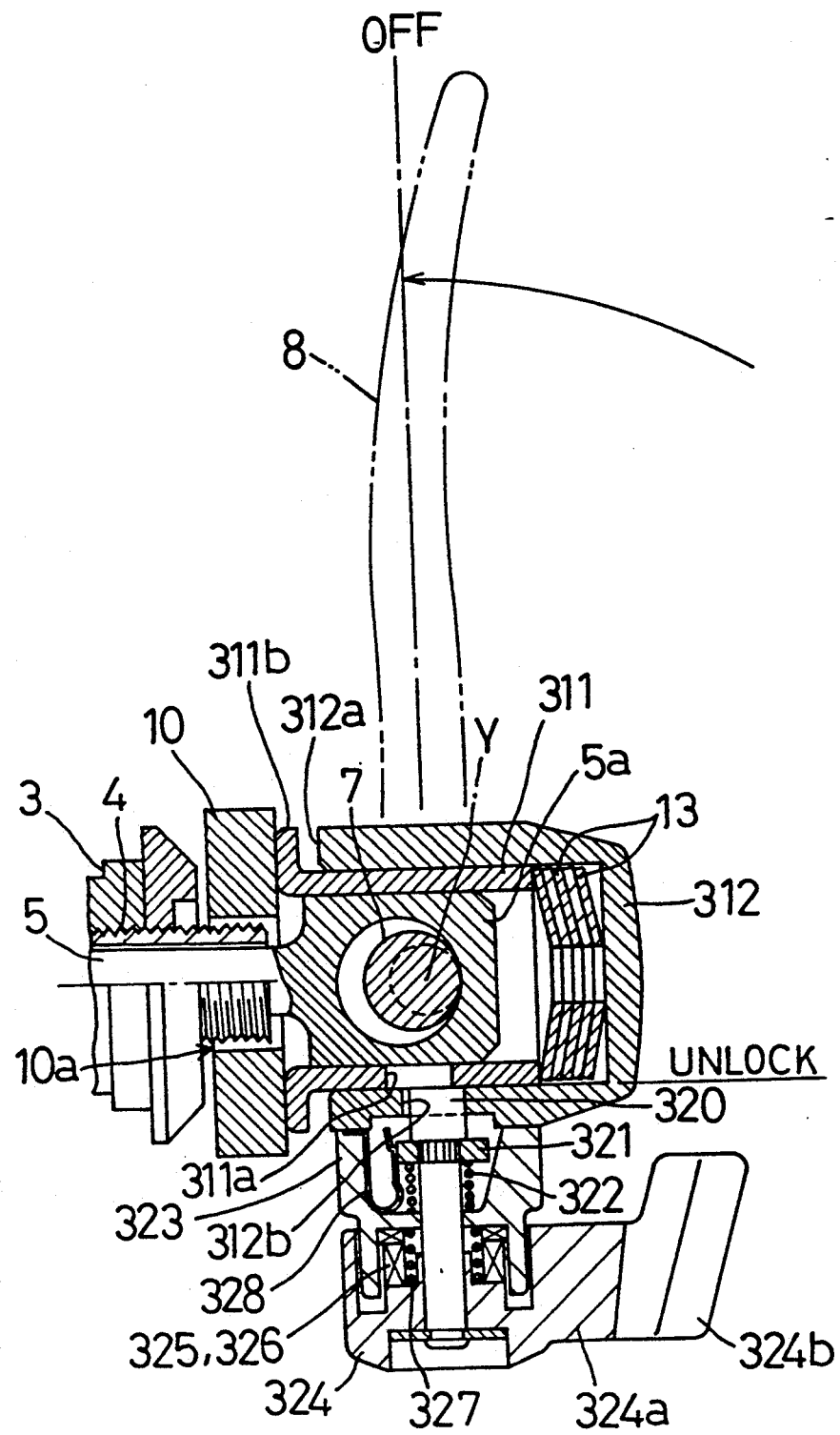
FIG. 24 is a sectional view showing interior of the locking mechanism of FIG. 23.

To tighten a wheel with this quick release apparatus, the release lever 324 is set to the release position, and the rocking lever 8 to an OFF position. These positions are shown in FIGS. 23 and 24. With the above setting, the housing 312 and presser 311 move relative to each other under the elastic restoring force of disc springs 13, to separate an end face 312a of the housing 312 and a flange 311b of the presser 311. As a result, the inner perforation 311a and outer perforation 312b are displaced from each other. The forward portion of the pin 320 contacts an outer peripheral surface of the presser 211, whereby the pin 320 is maintained in the unlock position despite the urging force of the compression spring 322. Consequently, as shown in FIG. 23, the engaging member 321 remains out of engagement with the cutout 7a. It will be seen from FIG. 24 that the engaging member 321 is urged rightward in FIG. 24 by a leaf spring, and thus the pin 320 also is urged rightward thereby positively to contact a righthand end of the outer perforation 312b of the housing 312. Thus, the outer perforation 312b may be formed significantly larger than the forward end of the pin 320.

Figure 25:
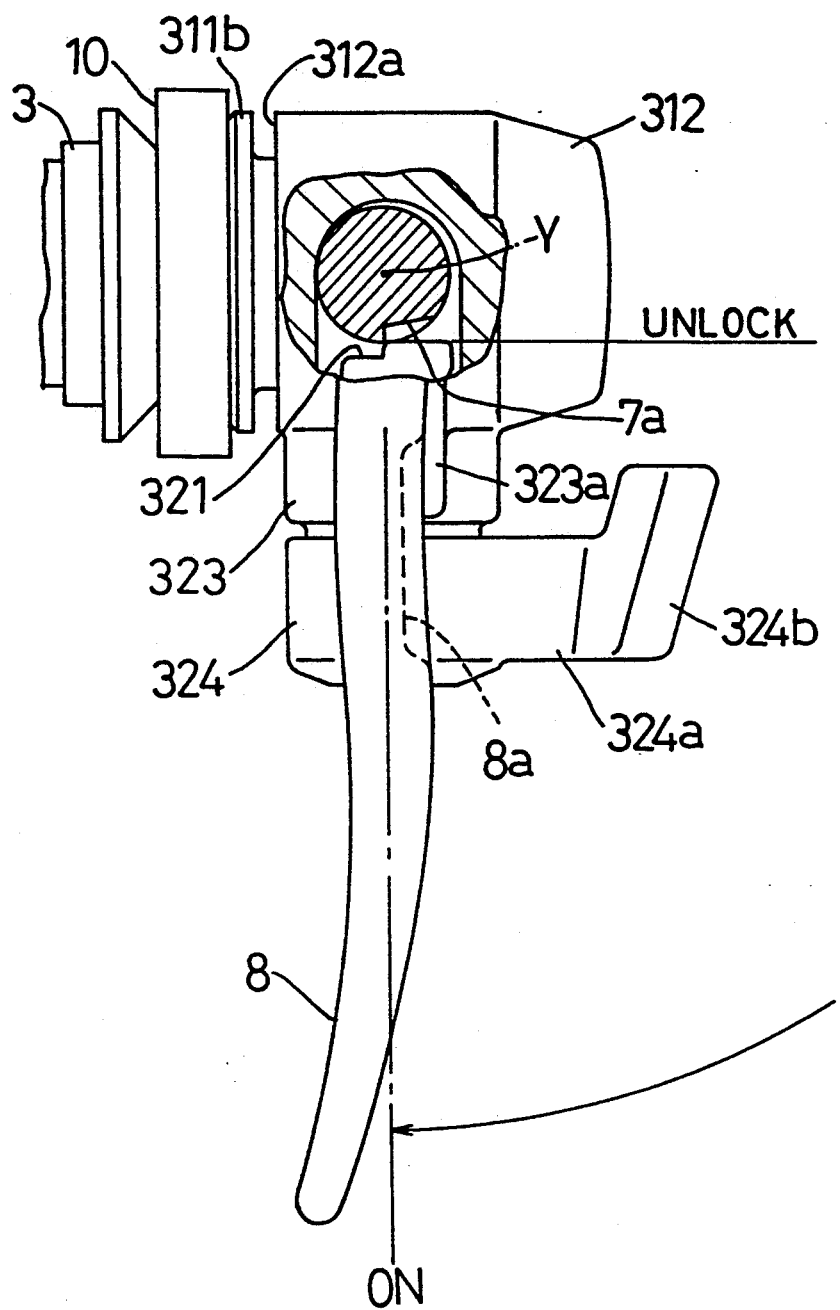
FIG. 25 is a view, partly in section, of the locking mechanism maintained in an unlock position after the lever is operated to an ON position from the position shown in FIG. 22.
Figure 26:
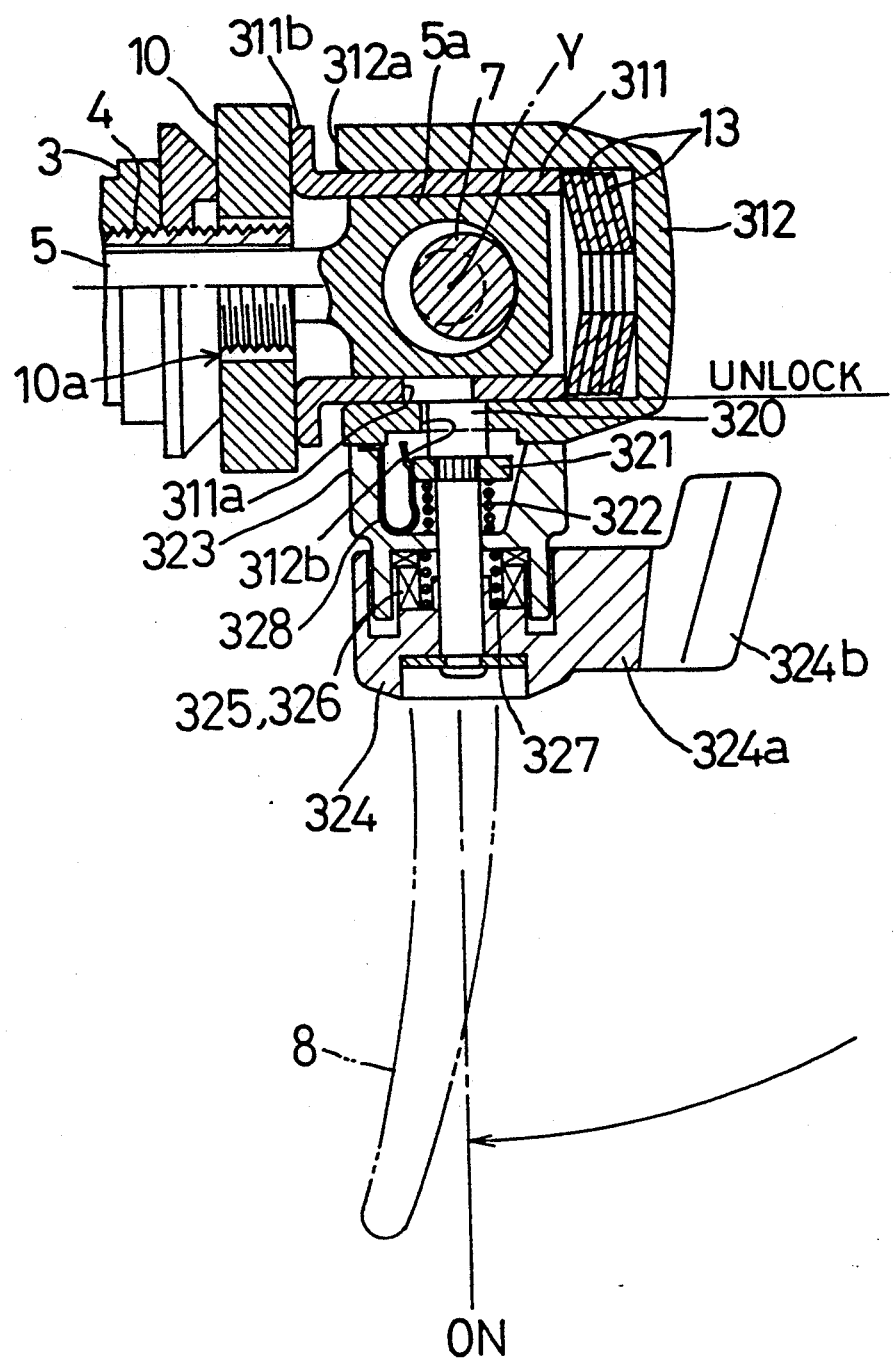
FIG. 26 is a sectional view showing interior of the locking mechanism of FIG. 25.

In this state, the rocking lever 8 may be turned clockwise in the drawings to an ON position to rotate the rotary cam 7 to a tightening position. This operation fails to deform the disc springs 13 sufficiently if no or insufficient tightening force is thereby produced, as in the preceding embodiments. In this case, the inner perforation 311a and outer perforation 312b remain displaced from each other to prevent the pin 320 from moving to the lock position. That is, the locking mechanism remains in the unlock position despite the rotation to the tightening position of the rotary cam 7. This state is shown in FIGS. 25 and 26.

Figure 27:
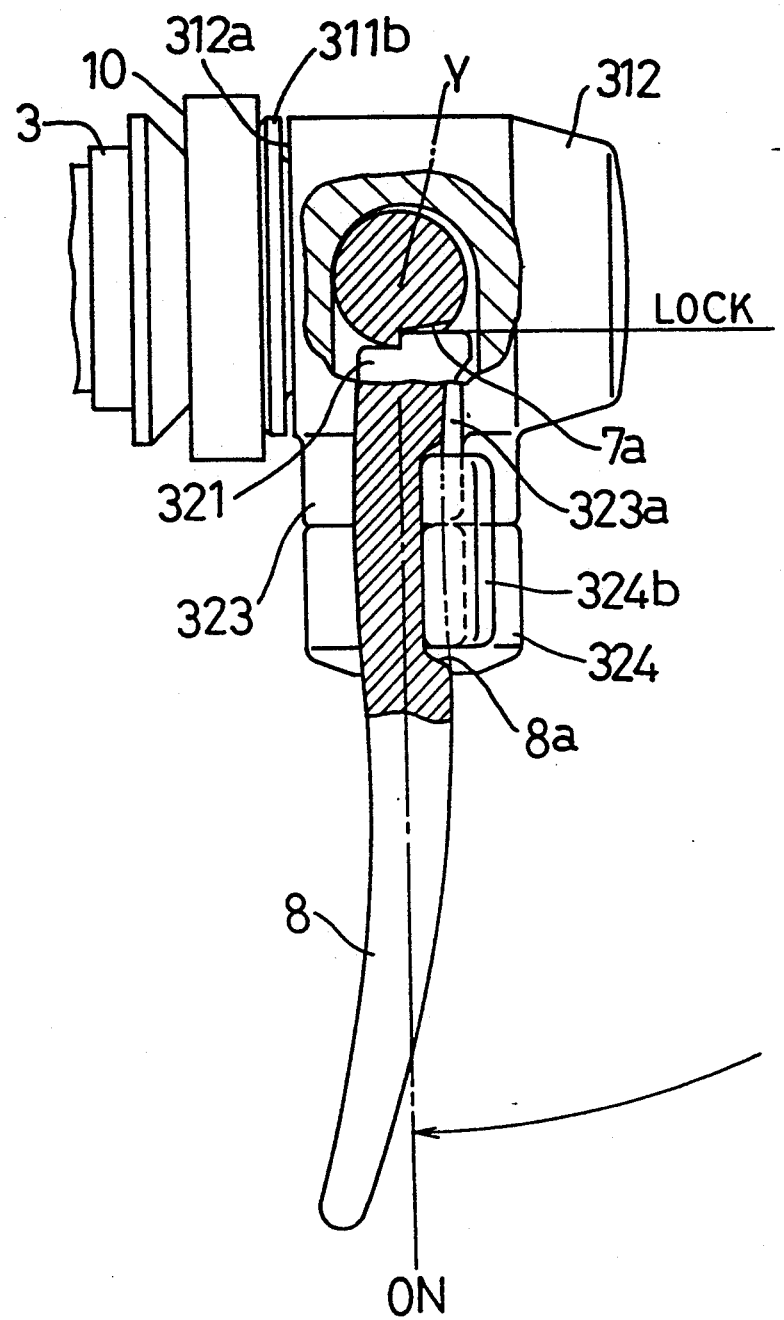
FIG. 27 is a view, partly in section, of the locking mechanism switched to a lock position with operation of the lever to the ON position from the position shown in FIG. 22.
Figure 28:
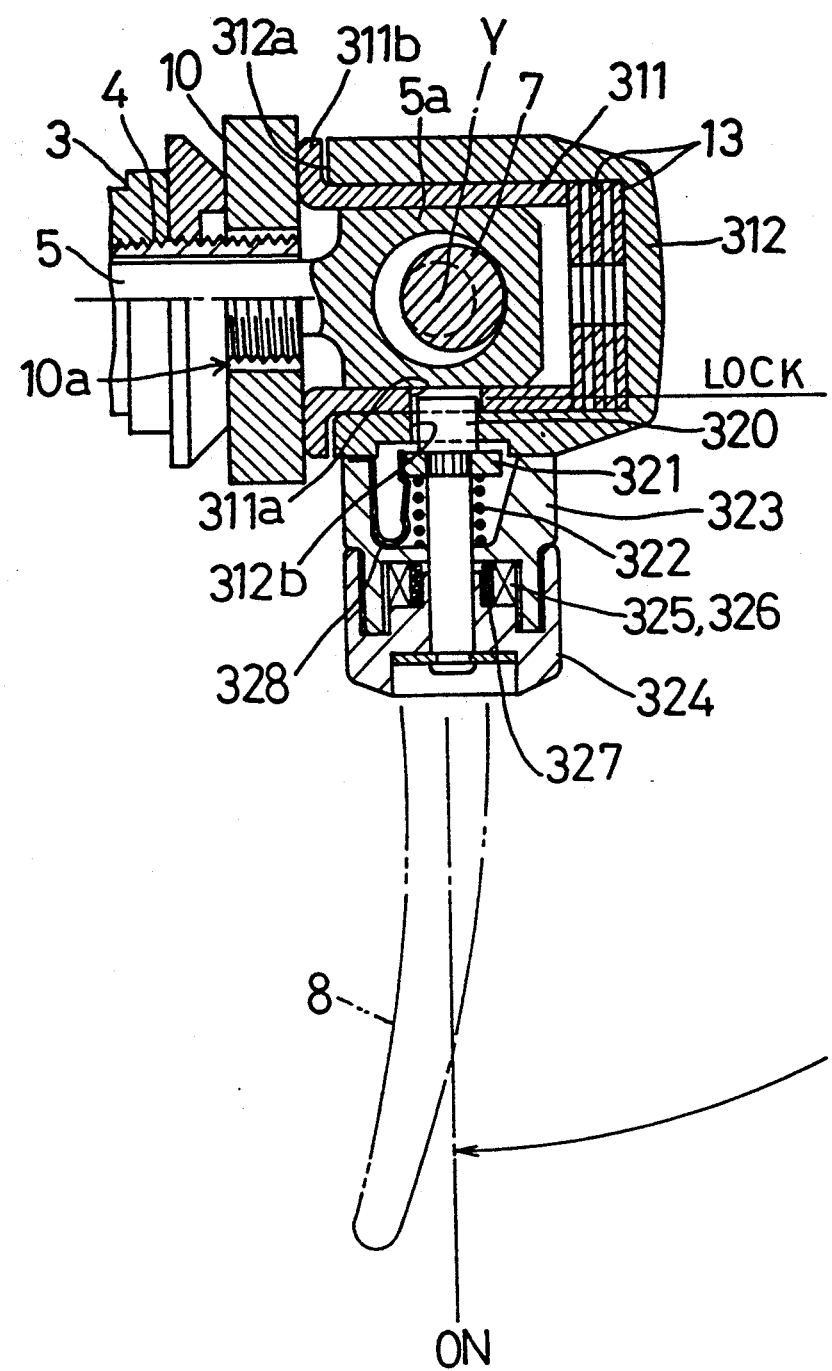
FIG. 28 is a sectional view showing interior of the locking mechanism of FIG. 27.
Figure 29:
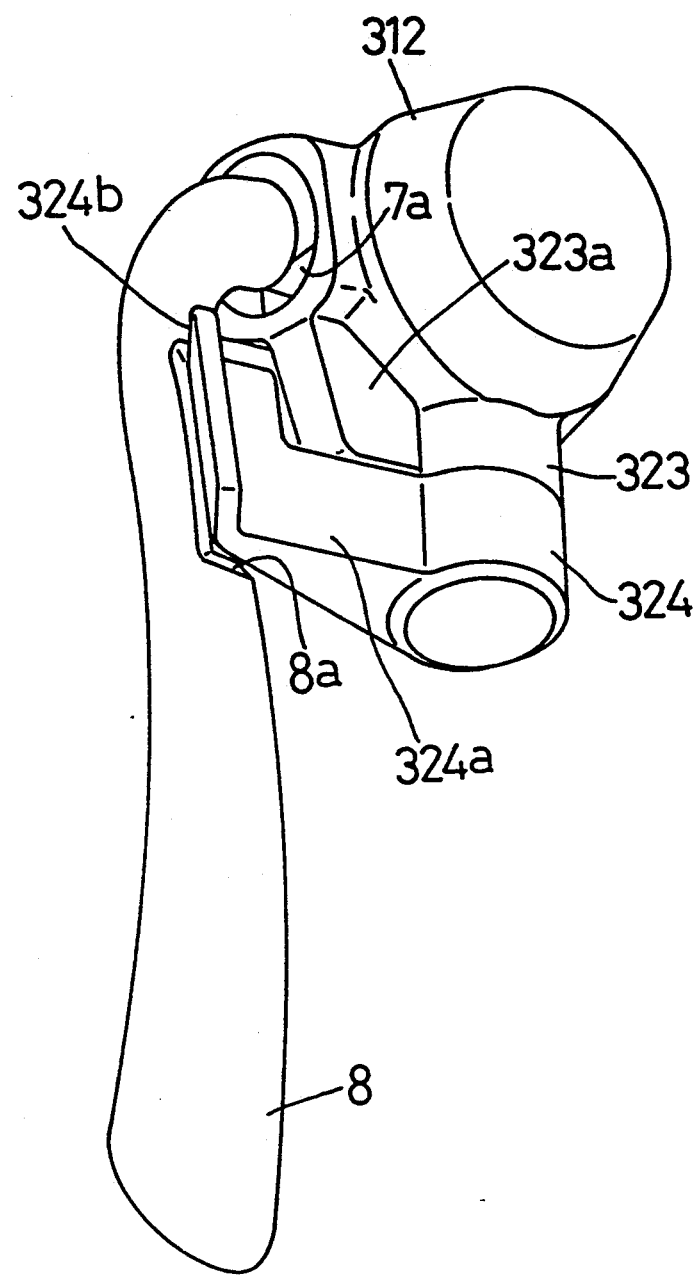
FIG. 29 is a perspective view of a release lever and a rocking lever shown in FIG. 28.

When a tightening force reaching or exceeding a predetermined force is produced by turning the rocking lever 8 to the ON position to rotate the rotary cam 7 to the tightening position, the housing 312 slides against the urging force of the disc springs 13 until the end face 312a approaches the flange 311b of the presser 311. Then the inner perforation 311a and outer perforation 312b move substantially into register to accept the forward end of the pin 320, thereby allowing the pin 320 to move to the lock position. With this movement of the pin 320, the engaging member 321 engages the cutout 7a to place the locking mechanism in operation. This state is shown in FIGS. 27 and 28. In response to the movement to the lock position of the pin 320, the release lever 324 automatically pivots to the home position through the action of the cam and cam follower. As shown in FIGS. 22 and 27, the release lever 324 enters a receiving recess 8a formed in a corresponding position of the rocking lever 8. This construction renders the lock mechanism very compact and good in appearance after the tightening operation. As clearly evident from FIGS. 22 and 29, with the release lever 324 in this position, a completion of the tightening operation, as well as a locking of the rotary cam 7, can be visually confirmed as a surface of an arm portion 324a of the release lever 324 comes to level with a surface 323a of a bulge toward the release lever 324 of the casing 323. The completion of the tightening operation can be further verified by an audible signal generated when said the cam follower 326 falls into a recess of said cam 325 as the pin 320 is displaced into its locking position.

The scope of the invention is not limited to the above described embodiment, and other forms of materialization of the principles owing to the present invention are also possible.

For example, the urging force of the disc springs 13 may be made adjustable to vary the tightening force for allowing the locking element to switch to the lock position.

The present invention is not limited in application to mounting of a bicycle hub, but may be used in various other applications for tightening and fixing purposes, such as mounting of a saddle of other bicycle components.

What is claimed is:

1. A quick release apparatus comprising:
   a drawbar extending axially;
   a first clamp and a second clamp mounted on said drawbar to be axially movable relative to each other between a tightening position and a release position;
   control means connected to said drawbar for moving said clamps between said tightening position and said release position; and
   lock means switchable between a lock position for prohibiting movement of said clamps from said tightening position to said release position, and an unlock position for allowing said movement;
   said lock means being switchable to said lock position when a tightening force of said clamps in said tightening position reaches a predetermined value, and remaining in said unlock position when said tightening force is less than said predetermined value.

2. A quick release apparatus as claimed in claim 1 wherein
   said first clamp is in form of a nut meshed to one end of said drawbar, and said second clamp includes a housing for axially slidably receiving a follower portion formed on the other end of said drawbar.

3. A quick release apparatus as claimed in claim 2 wherein
   said control means includes a lockable lever and a cam element connected to said follower portion.

4. A quick release apparatus as claimed in claim 3 wherein
   said cam element is an eccentric portion formed on an end region of said lockable lever and inserted into a bore formed in said follower portion of said drawbar.

5. A quick release apparatus as claimed in claim 3, wherein
   said housing includes a first tubular member, a second tubular member axially slidable relative to said first tubular member, and an elastic member disposed axially between said first and second tubular members, said lock means being switchable between said lock position and said unlock position in response to an elastic displacement of said elastic member.

6. A quick release apparatus as claimed in claim 5 wherein
   said lock means includes a locking member movable in response to said elastic displacement of said elastic member, said locking member including an engaging section for engaging a cutout formed in said control means when said lock means is in said lock position, thereby preventing movement of said lockable lever.

* * * * *